(12) United States Patent
Jibbe et al.

(10) Patent No.: US 10,216,597 B2
(45) Date of Patent: Feb. 26, 2019

(54) RECOVERING UNREADABLE DATA FOR A VAULTED VOLUME

(71) Applicant: NetApp, Inc., Sunnyvale, CA (US)

(72) Inventors: Mahmoud K. Jibbe, Wichita, KS (US); Keith Holt, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 15/142,659

(22) Filed: Apr. 29, 2016

(65) Prior Publication Data
US 2017/0315890 A1 Nov. 2, 2017

(51) Int. Cl.
*G06F 11/14* (2006.01)
*G06F 11/20* (2006.01)

(52) U.S. Cl.
CPC ...... *G06F 11/2094* (2013.01); *G06F 11/1469* (2013.01); *G06F 2201/805* (2013.01)

(58) Field of Classification Search
CPC ............. G06F 11/1016; G06F 11/1068; G06F 11/2094; G06F 11/1092
See application file for complete search history.

(56) References Cited

U.S. PATENT DOCUMENTS

| | | | | |
|---|---|---|---|---|
| 8,712,968 B1 * | 4/2014 | Chester | ............... | G06F 11/1469 707/649 |
| 9,235,486 B1 * | 1/2016 | Casaburi | ............. | G06F 11/2094 |
| 9,507,673 B1 * | 11/2016 | Rangapuram | ......... | G06F 3/0619 |
| 2004/0268179 A1 * | 12/2004 | Stewart | ............... | G06F 11/2087 714/6.13 |
| 2007/0136624 A1 * | 6/2007 | Ejiri | .................... | G06F 11/2221 714/710 |
| 2008/0155316 A1 * | 6/2008 | Pawar | ................. | G06F 11/1076 714/6.13 |
| 2010/0306174 A1 * | 12/2010 | Otani | ................... | G06F 11/1464 707/640 |
| 2011/0047340 A1 * | 2/2011 | Olson | ................. | G06F 11/1456 711/162 |
| 2011/0167221 A1 * | 7/2011 | Pangal | ................ | G06F 11/1453 711/117 |
| 2014/0189432 A1 * | 7/2014 | Gokhale | .......... | G06F 17/30289 714/41 |
| 2014/0222761 A1 * | 8/2014 | Zhang | ................. | G06F 11/1451 707/654 |
| 2014/0281697 A1 * | 9/2014 | Hsu-Hung | .......... | G06F 11/1088 714/15 |
| 2015/0286546 A1 * | 10/2015 | Brethauer | ............... | G01F 15/16 714/6.3 |

* cited by examiner

*Primary Examiner* — Yolanda L Wilson
(74) *Attorney, Agent, or Firm* — Haynes and Boone, LLP

(57) ABSTRACT

A method, a computing device, and a non-transitory machine-readable medium for replacing an unreadable sector in a storage system is provided. In some embodiments, the method includes identifying a sector from a plurality of sectors in a physical memory of a storage device in a storage system as an unreadable sector. An unreadable sector is a sector that includes data that had been corrupted and cannot be recovered from data in the storage system. In some embodiments, the unreadable sector is recovered by receiving a copy of a sector identified as the unreadable sector from a cloud storage, where the copy of the sector stores readable data and the cloud storage is a separate storage from the storage system. The method then includes replacing the unreadable sector with the copy at the sector at a memory location in the physical memory occupied by the unreadable sector.

19 Claims, 5 Drawing Sheets

RECOVERING UNREADABLE DATA FOR A VAULTED VOLUME

TECHNICAL FIELD

The description relates to a data storage architecture, and more specifically, to recovering data in the unreadable sectors within the data storage architecture.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput.

To provide this capacity, data storage systems evolved into increasingly complex systems. For example, some storage systems began to utilize one or more layers of indirection that allow connected systems to access data without concern for how the data is distributed among the storage devices. The connected systems issue transactions directed to a virtual address space that appears to be a single, contiguous device regardless of how many physical storage devices are incorporated into the virtual address space. It is left to the storage system to translate the virtual addresses into physical addresses and provide the physical address alone or in combination with the virtual address to the storage devices. RAID (Redundant Array of Independent/Inexpensive Disks) is one example of a technique for grouping storage devices into a virtual address space, although there are many others. In these applications and others, indirection hides the underlying complexity of the storage system from the connected systems and their applications.

RAID and also other indirection techniques implement different recovery mechanisms in the event a storage device fails. In one example, data in the RAID system can be stored in multiple copies on different storage devices. In this way, if one storage device fails data can still be recovered from copies stored on the other storage devices. In another example, RAID system stores a parity function for data in a storage device. The parity function is typically stored on a storage device other than the storage devices that stores data recoverable with the parity function. When a storage device fails, the parity function can be combined with the data stored on the functioning storage devices to recover the data on the storage device that failed. Such approach, however, does not work when storage devices that store multiple copies of data fail, or if storage devices that store data and the parity function fail.

BRIEF DESCRIPTION OF THE DRAWINGS

The disclosure is best understood from the following detailed description when read with the accompanying figures.

DETAILED DESCRIPTION

Figure 1:
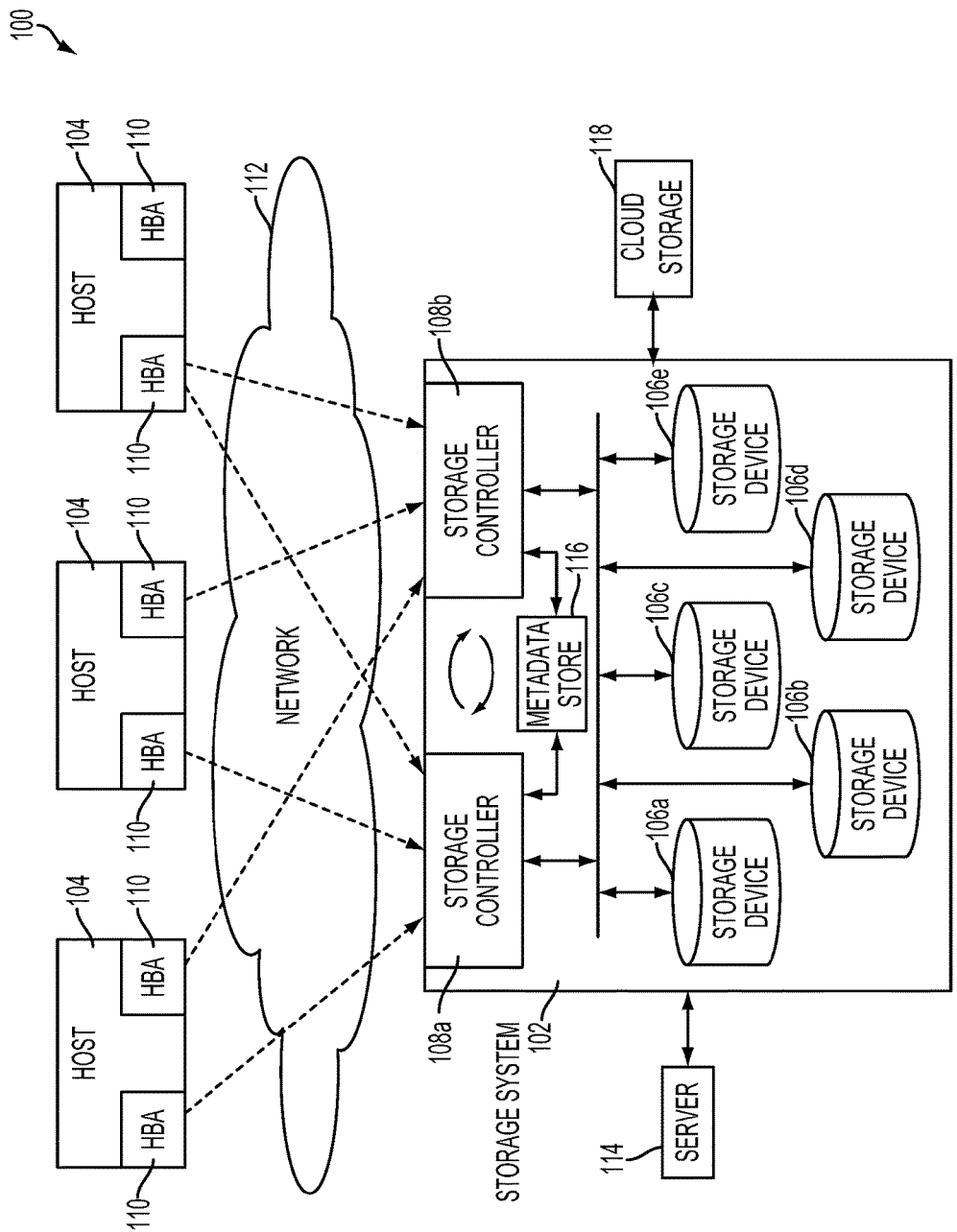
FIG. 1 is a block diagram of data storage architecture, according to an embodiment.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments unless otherwise noted. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for recovering data in an unrecoverable sector of the storage system from another storage system, such as a cloud storage. In an exemplary embodiment, a storage controller identifies an unreadable sector. The unreadable sector stores data that is corrupted and cannot be recovered from other storage devices in the storage system. As a result, systems connected to the storage system and their respective application can no longer access the data stored in the unreadable sector. An unreadable sector occurs for a variety of reasons, such as a faulty storage control firmware, faults/failures of other storage device(s) in the storage system which the storage system uses to recover the unreadable sector, etc. One example of a situation that may result in one or more unreadable sectors includes a dual fault in a RAID 5 volume, such as a failed drive plus a corrupted sector. Similarly, a triple fault involving two failed drives plus a corrupted sector in a RAID 6 volume may also cause an unreadable sector.

In order to recover data in the unreadable sector, a storage system can utilize outside storage systems, such as a cloud storage. When the data in the unreadable sector had previously been uploaded or vaulted to the cloud storage, the data in the cloud storage can be copied back to the storage system to recover the unreadable sector. For example, when a logical block address (LBA) for the unreadable sector has not changed since the data had last been vaulted to the cloud storage, the data in the cloud storage can be copied into the physical memory space of the unreadable sector, thus recovering the unreadable sector in the storage system.

FIG. 1 is a block diagram of a data storage architecture 100 according to an embodiment. The data storage architecture 100 includes a storage system 102 that processes data transactions on behalf of other computing systems implemented in one or more hosts 104. The storage system 102 is only one example of a computing system that may perform data storage and indirection (i.e., virtualization). It is understood that the present technique may be performed by any computing system (e.g., a host 104 or third-party system) operable to read and/or write data from any suitable storage device 106. For instance, in some embodiments one or more storage controllers 108 perform the techniques described herein, including those described with respect to the flowcharts of FIGS. 4 and 5.

The exemplary storage system 102 receives data transactions (e.g., requests to read and/or write data) from the hosts 104 and takes an action such as reading, writing, or otherwise accessing the requested data so that the storage devices 106, such as storage devices 106*a*-*e* of the storage system 102 appear to be directly connected (local) to the hosts 104. This allows an application running on a host 104 to issue transactions directed to the storage devices 106 of the storage system 102 and thereby access data on the storage system 102 as easily as it can access data on the storage devices of the host 104. Although for illustrative purposes a single storage system 102 communicating with multiple hosts 104 is shown, a storage system 102 may include any number of computing devices and may range from a single computing system to a system cluster of any size and may communicate with one or more hosts 104.

In an embodiment, each storage system 102 and host 104 includes at least one computing system, which in turn may include a processor operable to perform various computing instructions, such as a microcontroller, a central processing unit (CPU), or any other computer processing device. The computing system may also include a memory device such as random access memory (RAM); a non-transitory machine-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108 of the storage system 102. The HBA 110 provides an interface for communicating with the storage controller 108, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

In many embodiments, the host HBAs 110 are coupled to the storage system 102 via a network 112, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 110 of a host 104 sends one or more data transactions to the storage system 102 via the network 112. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. As another example, embodiments of the present disclosure may utilize object-based storage, where objects are instantiated that are used to manage data instead of as blocks or in file hierarchies. In such systems, objects are written to the storage system similar to a file system in that when an object is written, the object is an accessible entity. Such systems expose an interface that enables other systems to read and write named objects, that may vary in size, and handle low-level block allocation internally (e.g., by the storage controllers 108*a*, 108*b*). It is understood that the scope of the disclosure is not limited to either block-level or file-level protocols or object-based protocols, and in many embodiments, the storage system 102 is responsive to a number of different memory transaction protocols.

With respect to the storage system 102, the exemplary storage system 102 contains one or more storage controllers 108, such as storage controllers 108*a* and 108*b* that receive the transactions from the host(s) 104 and that perform the data transaction using the storage devices 106. In an embodiment, host 104 and the storage devices 106 may use different addresses to refer to the same data. For example, the host 104 may refer to a virtual address (e.g., a Logical Block Address, aka LBA) when it issues a transaction regardless of the protocol that is used to access and store data. Upon receiving the transaction, the storage system 102 may convert the virtual address into a physical address, which it provides to the storage devices 106. In other examples, the host 104 may issue data transactions directed to virtual addresses that the storage system 102 converts into other virtual or physical addresses.

In fact, the storage system 102 may convert addresses to other types of addresses several times before determining a final address to provide to the storage devices 106. In the illustrated embodiments, the storage controllers 108 or other elements of the storage system 102 convert LBAs contained in the hosts' data transactions to physical block address, which is then provided to the storage devices 106.

In an embodiment, the storage system 102 may group the storage devices 106 for speed and/or redundancy using a virtualization technique such as RAID level.

In addition, the storage system 102 may also include a metadata store 116. The metadata store 116 may be composed of one or more storage devices, such as one or more solid-state devices. The metadata store 116 may serve to store metadata regarding data (e.g., written from one or more hosts 104) in the storage devices 106. In an embodiment, write data may be received from one or more hosts 104 and momentarily stored in a write-back cache of the storage system 102, e.g. using LBAs. The metadata store 116 may house metadata that facilitates translating the specified LBAs of the data in the write-back cache to block addresses used by the storage devices 106, metadata that facilitates data recovery, metadata that identifies back-up information, etc.

In an embodiment, storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an embodiment, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1 without departing from the scope of the present disclosure.

In an embodiment, storage system 102 may also be communicatively coupled to a cloud storage 118. The cloud storage 118 stores and manages data from multiple storage systems 102 across numerous physical servers stored at one or more locations, and is designed for mass data storage. To store data, physical servers may include at least one computing system, which in turn includes one or more processors, as discussed above. The computing system may also include one or more memory devices adept to storing large quantities of data. The cloud storage 118 may include a general purpose computer or a special purpose computer and may be embodied, for instance, as a server running a storage operating system that manipulates large amounts of data in the memory devices.

In an embodiment, cloud storage 118 stores back-up data or archival data from different storage systems 102. For example, storage controllers 108 back-up data from one or more storage devices 106 to cloud storage 118. The data may be backed-up using various algorithms that back-up data belonging to one or more sectors in storage device 106, data belonging to one or more hosts 104 or data physically stored on one or more storage device 106. In an embodiment, storage controller 108 backs-up data incrementally, based on usage, and/or other configurable settings that are stored in storage controller 108 or can be configured by an administrator using server 114 or host 104.

Continuing with the example, storage controller 108 backs-up data sector by sector. A sector is a physical memory space at a designated physical or logical memory address in the storage device 106, as will be described below. For example, storage controller 108 uses the LBA range for a sector to upload data to the cloud storage 118. The cloud storage 118 then associates data in the sector with a physical and/or virtual address of the location of the data in the cloud storage 118. In addition, when storage controller 108 backs-up the sector, the storage controller 108 stores the back-up information identifying the time of the back-up, the LBA range for a sector, etc., in metadata store 116 or another storage in the storage system 102.

Figure 2:
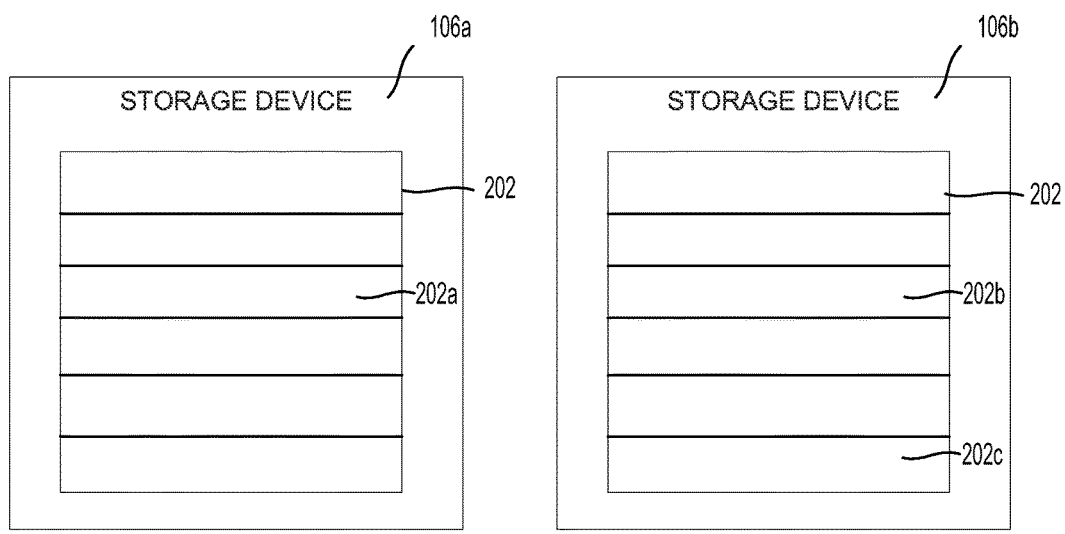
FIG. 2 is a block diagram of a physical memory of a storage drive, according to an embodiment.

In an embodiment, data in a storage device 106 is physically stored in one or more sectors or blocks. FIG. 2 is a block diagram 200 of a physical memory space of a storage device, according to an embodiment. As illustrated in FIG. 2, memory of the storage devices 106a and 106b are divided into one or more sectors, collectively referred to as sectors 202. The storage devices 106a and 106b in FIG. 2 can be any one of storage devices 106a-e. Each sector 202, such as exemplary sector 202a, represents a physical location in memory that stores data. Each physical block is associated with a physical memory address. In an embodiment, storage controller 108 can access sectors 202 using a LBA or LBA range provided by host 104. In this case, storage controller 108 converts the LBA or LBA range to a physical address that corresponds to the physical location of the sectors 202. Because data is stored virtually in the storage system 102, data from host 104 may be stored across multiple sectors 202 of one or more storage devices 106a-e within a designated LBA range (not shown). In another embodiment, data from multiple hosts 104 may be stored in a single sector, such as sector 202a.

To preserve data, storage system 102 implements a variety of recovery mechanisms. In one embodiment, storage system 102, such as a storage system implementing the RAID 1 technique, stores two or more copies of data in different sectors 202 on different storage devices 106. For example, storage system 102 stores the same data in sectors 202a and 202b on storage devices 106a and 106b. In other embodiments, storage system 102, such as a storage system implementing the RAID 5 technique, implements a parity technique. The parity technique to calculate a parity function for each sector 202. The parity function can be combined with data stored on one or more storage devices 106 to recover data in a particular sector 202. Typically, the parity function is stored on a different storage device 106 from the storage device 106 that stores the particular sector 202. For example, if storage device 106a stores sector 202a, then storage device 106b may store the parity function that is used to recover data of sector 202a in sector 202c, and also data that is used together with the parity function to recover data of sector 202a in sector 202b. In another embodiment, such as in storage system 102 implementing a RAID 6 technique, if the storage device 106a stores sector 202a, then storage devices 106b and 106c store the parity function and data that is used with the parity function to recover sector 202a (not shown).

In an embodiment, storage system 102 may include instances when a corrupted sector 202a cannot be recovered. This occurs, for example, when a parity function and/or data stored in other storage devices 106, such as storage device 106b also becomes corrupted or unavailable in addition to the data in sector 202a. For example, if storage device 106b fails and parity function is inaccessible when sector 202a is corrupted, storage system 102 is unable to recover sector 202a. When sector 202a cannot be recovered using components inside the storage system 102, storage controller 108 marks the sector as an unreadable sector in metadata store 116.

In a further embodiment, storage system 102 may not include a recovery mechanism within storage system 102. For example, storage devices 106 may store data in sectors 202 without redundancy or parity information that can be used for data recovery. Such embodiment may be configured in the storage system 102 that requires high throughput and rapid read and write transaction to/from hosts 104. In this case, if storage controller 108 marks sector 202a as an unreadable sector, the storage system 102 cannot recover sector 202a using data within storage system 102.

In yet another embodiment, storage controller 108 executes firmware which may cause the sector to become unreadable. For example, faults in the firmware may scramble LBA of the sector, write improper data to the sector, etc.

In an embodiment, once the sector is marked as unreadable, host 104 can no longer retrieve data from the sector. In such a case, storage controller 108 reports an error to the host 104 that a sector is unreadable and cannot be reconstructed. In these instances, conventional storage systems may cause hosts to lose data or initialize an expensive and time consuming system recovery that uploads back-up or archival data across some or all storage devices and reassigns the data to different sectors with different LBAs and physical addresses.

Figure 3:
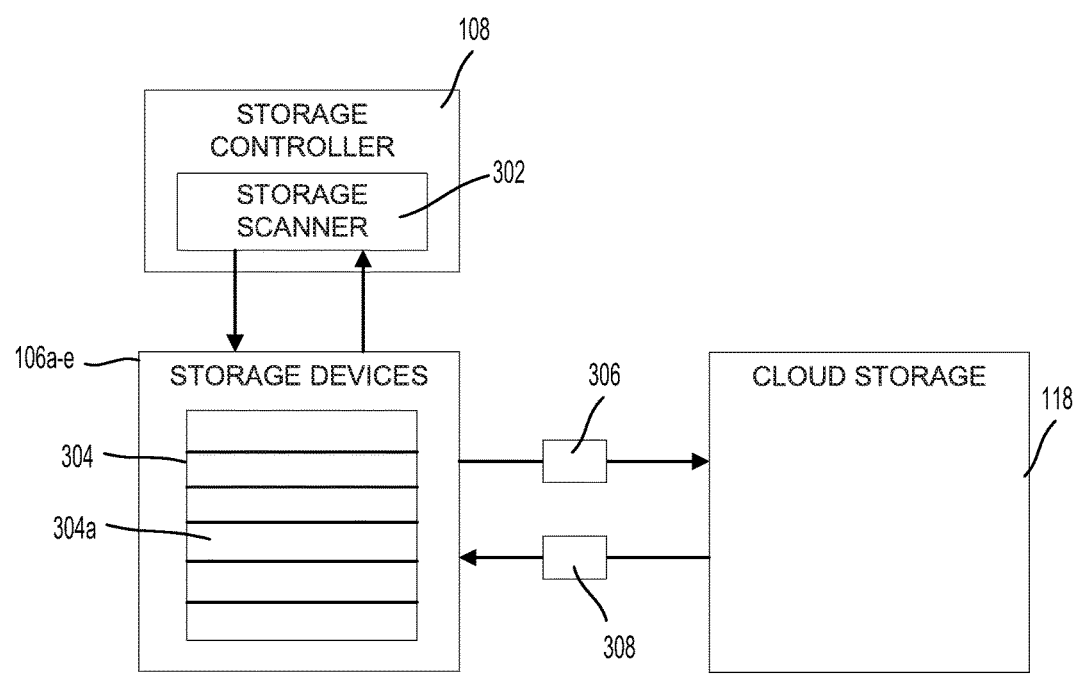
FIG. 3 is a block diagram of a storage system that recovers an unreadable sector from the cloud storage, according to an embodiment.

In an embodiment, when storage system 102 cannot recreate an unreadable sector, storage system 102 attempts to recover the sector from cloud storage 118. FIG. 3 is a block diagram 300 of a storage system that recovers an unreadable sector from the cloud storage, according to an embodiment.

As illustrated in FIG. 3, storage controller 108 includes a storage scanner 302. Storage scanner 302 scans one or more sectors 304 in storage devices 106a-e for unreadable sectors, such as sector 304a. In an embodiment, storage scanner 302 executes in the background of storage system 102 and identifies unreadable sectors without any action from host 104. In another embodiment, host 104 can request storage scanner 302 to scan storage devices 106a-e for unreadable sectors, when, for example, host 104 receives an error message indicating that one or more unreadable sectors exist in storage system 102.

When the storage scanner 302 identifies sector 304a as an unreadable sector, storage controller 108 determines whether sector 304a can be recovered from the cloud storage 118. For example, storage controller 108 identifies a memory address associated with sector 304a. In an embodiment, the memory address can be the LBA, the LBA range, a physical memory address, or another appropriate memory address memory according to an addressing technique. In a further embodiment, storage controller 108 may also determine whether the memory address of sector 304a has changed since the last time sector 304a had been uploaded to cloud storage 118. Storage controller 108 can make the determination by comparing the LBA range or another memory address at the time the now unreadable sector 304a has been uploaded to the cloud storage 118 to the current LBA range or another memory address of the unreadable sector 304a. In an embodiment, if the memory address has not changed, cloud storage 118 can recover sector 304a from the cloud storage 118. A person of ordinary skill in the art will appreciate that these examples are not limiting and that storage controller 108 can use other information associated with sector 304a to determine whether sector 304a can be recovered from the cloud storage 118.

When the storage controller 108 determines that sector 304a is recoverable from the cloud storage 118, storage controller 108 requests a copy of sector 304a. In an embodiment, to request a copy of sector 304a, the storage controller 108 generates a request message 306. The request message 306 may include a memory address of sector 304a, a sector identifier, or another parameter that identifies sector 304a in cloud storage 118 and/or enables cloud storage 118 to retrieve a copy of sector 304a. The storage controller 108 then causes the storage system 102 to transmit the request message 306 to the cloud storage 118.

In an embodiment, once cloud storage 118 receives the request message 306, cloud storage 118 uses information in the request message 306 to identify and retrieve a copy of sector 304a. Cloud storage 118 then formats the copy of sector 304a into one or more messages 308 and transmits the one or more messages 308 back to the storage system 102.

Continuing with the embodiment, storage controller 108 receives the one or more messages 308, and extracts the copy of sector 304a from the one or more messages 308. Storage controller 108 then stores the copy of sector 304a from the cloud storage 118 into the physical memory space of sector 304a. As discussed before, storage controller 118 may use metadata store 116 to identify the LBA and/or physical address of sector 304. In this way, storage system 102 obtains access to the uncorrupted data stored in the unreadable sector 304a without having to allocate a new memory space to store the recovered copy of sector 304a. And, because the storage system 102 saves the data to the same physical address, storage system 102 does not need to reconfigure the physical and LBA addresses in storage devices 106a-e to make data in the recovered sector 304a be accessible by host(s) 104. Further, in this way, the recovery of the unreadable sector is not driven by the host 104, but by a storage system 102 that repairs the sector from another data storage system, such as cloud storage 118. Yet further, replacing data in the same physical space of sector 304a eliminates a costly bulk restore operation in storage system 102 that requires restoration of all data in one or more storage devices 106.

Although embodiments described in FIG. 3 refer to recovering an unreadable sector 304a, a person of ordinary skill in the art will appreciate that the same embodiments can be used to recover multiple sectors 304 that were marked unreadable by the storage controller 108. To recover multiple sectors 304, storage controller 108 can transmit a memory address range, such as the LBA range, that corresponds to the physical memory location of the multiple sectors 304. Alternatively, storage controller 108 can request individually a copy of each unreadable sector, as described above.

Figure 4:
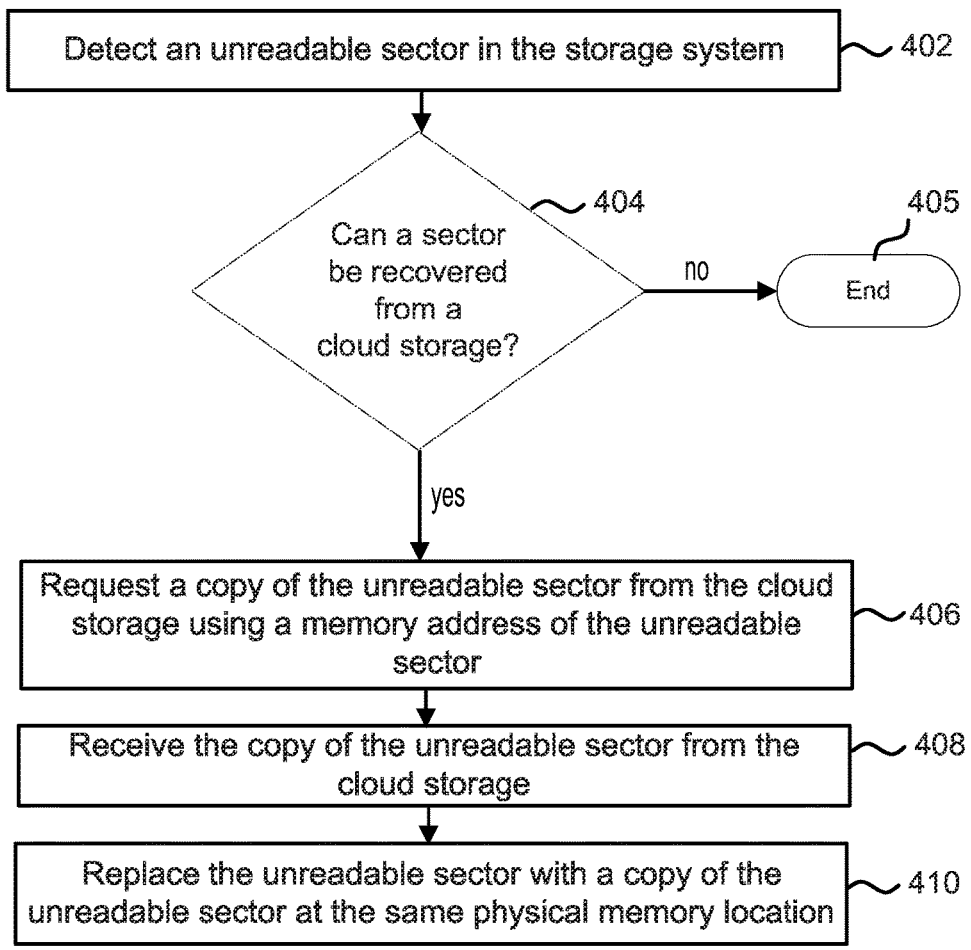
FIG. 4 is a flowchart of a method for recovering an unreadable sector, according to an embodiment.

FIG. 4 is a flowchart of a method 400 for recovering an unreadable sector, according to an embodiment. Method 400 may be implemented in hardware, software, or a combination thereof, of the components described in FIGS. 1-3. Method 400 may be implemented when storage system 102 does not have an internal data recovery system or when one or more devices that store recovery information for an unreadable sector fail, although the implementation is not limited to these embodiments.

At operation 402, an unreadable sector is detected in a storage system. For example, storage scanner 302 scans storage devices 106a-e in storage system 102 and detects unreadable sectors, such as sector 304a in storage device 106a.

At operation 404, a determination is made as to whether the unreadable sector can be recovered from the cloud storage. For example, storage controller 108 determines whether a memory address, such as LBA range, has changed since the unreadable sector 304a has last been uploaded to the cloud storage 118. In an embodiment, storage controller 108 can make the determination by comparing the LBA range at the time the now unreadable sector 304a has been uploaded to the cloud storage 118 to the current LBA range of the unreadable sector 304a. If the memory address did not change, the unreadable sector 304a is recoverable and the method proceeds to operation 406. Otherwise, the method ends at operation 405.

At operation 406, a copy of the unreadable sector is requested from the cloud storage. For example, storage controller 108 requests a copy of sector 304a from the cloud storage 118. As part of the request, storage controller 108 generates and transmits the request message 306 to cloud storage 118. The request message 306 includes an LBA address, sector identifier, or other information that identifies the copy of the sector 304a in the cloud storage 118.

At operation 408, a copy of the sector is received from the cloud storage. For example, the cloud storage 118 uses information in the request message 306 to retrieve the copy of sector 304a from the memory storage in cloud storage 118. Once retrieved, the copy to sector 304a is transmitted by cloud storage 118 as message 308 and received by storage system 102.

At operation 410, an unreadable sector is replaced. For example, storage controller 108 retrieves a copy of sector 304a and stores the copy of sector 304a into the physical memory space of sector 304a. In an embodiment, the storage controller 108 identifies the physical memory space from the LBA range that corresponds to the physical memory range determined using the metadata store 116. In this way, data in sector 304a can be retrieved by hosts 104, and storage system 102 replaces an unreadable sector in a way that is transparent to host 104 and efficient to storage system 102.

Figure 5:
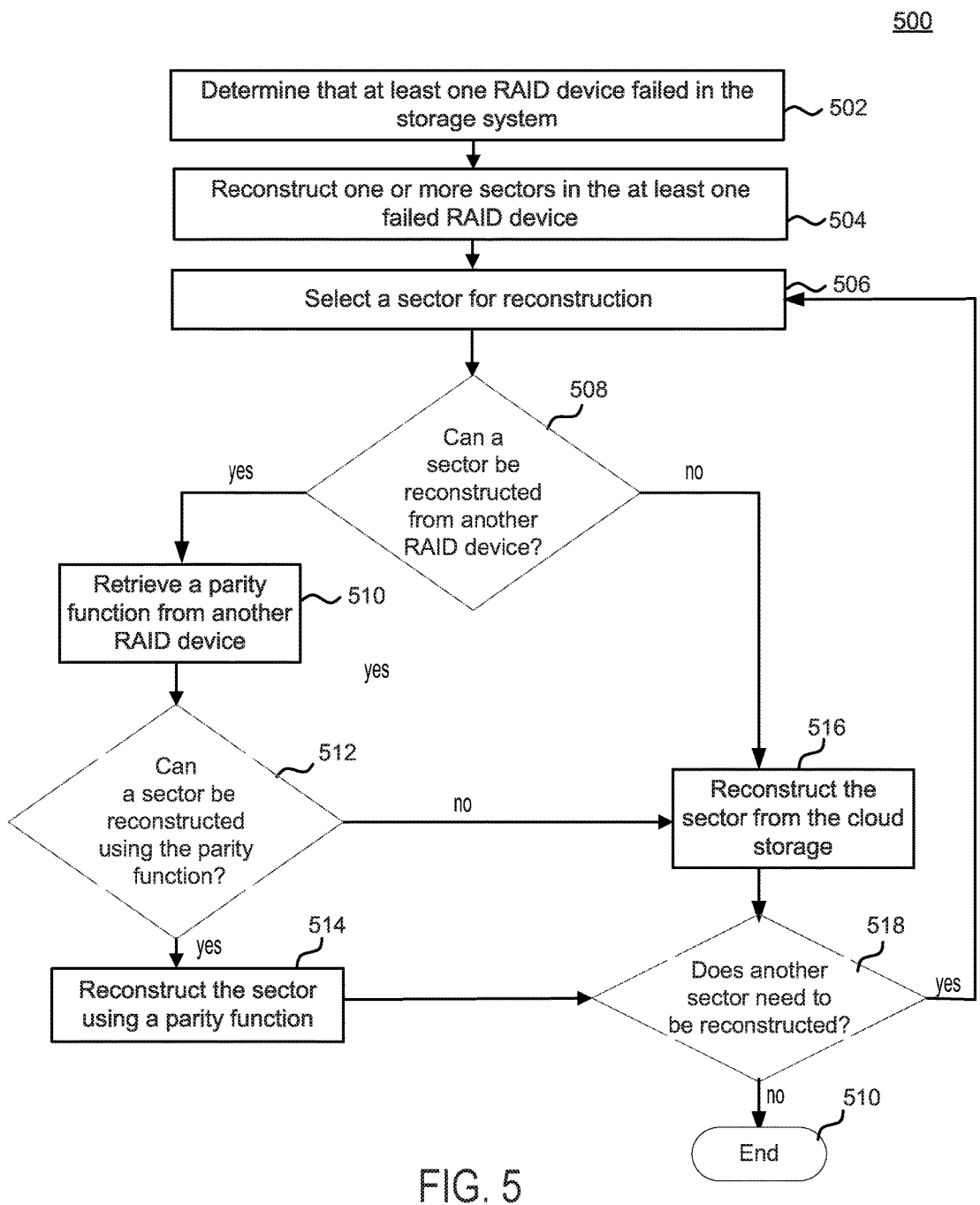
FIG. 5 is a flowchart of a method for recovering an unreadable sector in a storage system implementing RAID technology, according to an embodiment.

FIG. 5 is a flowchart of a method 500 for recovering an unreadable sector in a storage system implementing RAID technology, according to an embodiment. Method 500 may be implemented in hardware, software, or a combination thereof, of the components described in FIGS. 1-3. In a further non-limiting embodiment, storage devices 106a-e may be RAID enabled drives that can recover an unreadable sector using a parity function.

At operation 502, a failure of at least one RAID device is determined. For example, storage system 102 determines that at least one storage device, such as storage device 106a and/or 106b have failed.

At operation 504, one or more sectors in the at least one failed RAID device are reconstructed. The reconstruction is discussed in detail using operations 506-516, all of which may be included in operation 504.

At operation 506, a sector is selected for reconstruction. For example, storage controller 108 selects one of sectors 202, such as sector 202a for reconstruction.

At operation 508, a determination is made whether the sector can be recovered from another RAID device in the storage system 102. As discussed above, the data in the sectors of a RAID device can be recovered from other RAID devices in some embodiments. If the at least one failed storage device 106 can be recovered from storage system 102, the method proceeds to operation 510. Otherwise, storage controller 108 marks sector 202a as unreadable and the method proceeds to operation 516.

At operation 510, a parity function for a sector is retrieved from a non-failed RAID drive. For example, if storage device 106a failed and storage device 106b stores the parity function that recovers data in sector 202a, storage controller 108 reads a parity function from storage device 106b.

At operation 512, a determination is made as to whether the data can be reconstructed using the parity function. If the data in sector 202a of the storage device 106a can be reconstructed, the method proceeds to operation 514. Otherwise storage controller 108 marks sector 202a as unreadable, and the method proceeds to operation 516.

At operation 514, the sector is reconstructed using a parity function. For example, storage controller 108 reconstructs sector 202a in storage device 106a using a parity function stored in the storage device 106b.

At operation 516, the unreadable sector is reconstructed from the cloud storage. As described above, there may be reasons for sector 202a to be reconstructed from the cloud storage 118, such as when storage device 106b also failed and the parity function used to reconstruct the sector is no longer available. As also described above, when the unreadable sector, such as sector 202a is reconstructed from cloud storage 118, a copy of sector 202a is copied from the cloud storage 118 to the same physical memory location that sector 202a occupies in storage device 106a. In a further embodiment, operation 516 includes some or all operations described in method 400.

At operation 518, a determination is made as to whether another sector needs to be reconstructed. If another sector from sectors 202 needs to be reconstructed, the method proceeds to operation 506. Otherwise, the method ends at operation 520.

In various embodiments, the technique is performed by using various combinations of dedicated, fixed-function computing elements and programmable computing elements executing software instructions. Accordingly, it is understood that any of the steps of methods described herein may be implemented by a computing system using corresponding instructions stored on or in a non-transitory machine-readable medium accessible by the processing system. For the purposes of this description, a tangible machine-usable or machine-readable medium can be any apparatus that can store the program for use by or in connection with the instruction execution system, apparatus, or device. The medium may include non-volatile memory including magnetic storage, solid-state storage, optical storage, cache memory, and/or Random Access Memory (RAM).

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   identifying a sector from a plurality of sectors in a physical memory of a storage system as an unreadable sector;
   determining that a logical block address range of the unreadable sector matches a logical block address range of a copy of the sector identified as the unreadable sector that was previously uploaded to a cloud storage, wherein the copy of the sector stores readable data and a match indicates that the logical block address of the unreadable sector has not changed since the copy of the sector was previously uploaded to the cloud storage;
   based on the determining, receiving the copy of the sector from the cloud storage; and
   replacing the unreadable sector with the copy of the sector at a same location in the physical memory occupied by the unreadable sector.

2. The method of claim 1, wherein the unreadable sector includes data that has been corrupted and cannot be recovered from data in the storage system that includes the storage device.

3. The method of claim 1, wherein the unreadable sector is a sector that cannot be recovered by the storage system that includes the storage device.

4. The method of claim 1, further comprising:
   requesting the copy of the sector from the cloud storage using a memory address of the unreadable sector.

5. The method of claim 4, wherein the memory address comprises a logical block address.

6. The method of claim 1, further comprising:
   requesting the copy of the sector identified as the unreadable sector in response to determining that the logical block address range of the unreadable sector matches the logical block address range of a copy of the sector.

7. The method of claim 1, further comprising:
   identifying the sector as the unreadable sector as a result of a failure of the storage device.

8. The method of claim 1, wherein the sector identified as the unreadable sector cannot be recreated using a parity stored in the storage system.

9. The method of claim 1, further comprising:
   generating a request that includes the logical block address range and an identifier of the copy of the sector identified as the unreadable sector.

10. A non-transitory machine readable medium having stored thereon instructions for performing a method comprising machine executable code, which when executed by at least one machine, cause the machine to:
    identify a sector in a physical memory of a storage device in a storage system as an unreadable sector;
    determine that a logical block address range of the unreadable sector matches a logical block address range of a copy of the sector identified as the unreadable sector that was previously uploaded to a cloud storage, wherein the copy of the sector stores readable data and a match indicates that the logical block address of the unreadable sector has not changed since the copy of the sector was previously uploaded to the cloud storage;
    based on the determination, receive the copy of the sector from the cloud storage; and
    replace the unreadable sector with the copy of the sector at a same location in the physical memory occupied by the unreadable sector.

11. The non-transitory machine readable medium of claim 10, wherein the unreadable sector includes data that has been corrupted and cannot be recovered from data in the storage system that includes the storage device.

12. The non-transitory machine readable medium of claim 10, wherein to identify the unreadable sector, the instructions for performing the method comprising machine executable code, which when executed by at least one machine, further causes the machine to:
    identify the sector as the unreadable sector, in response to the storage system being unable to recover the sector from multiple computing devices communicatively connected to the storage system.

13. The non-transitory machine readable medium of claim 10, wherein the instructions for performing the method comprising machine executable code, which when executed by at least one machine, further causes the machine to:
    request the copy of the sector from the cloud storage using a logical block address of the unreadable sector.

14. The non-transitory machine readable medium of claim 10, wherein the instructions for performing the method comprising machine executable code, which when executed by at least one machine, further causes the machine to:
    request the copy of the sector identified as the unreadable sector in response to determining the match between the logical block address range of the unreadable sector and the logical block address range of a copy of the sector.

15. A computing device comprising:
    a memory containing machine readable medium comprising machine executable code having stored thereon instructions for performing a method of memory management; and
    a processor coupled to the memory, the processor configured to execute the machine executable code to cause the processor to:
    identify a sector from a plurality of sectors in a physical memory of a storage device in a storage system as an unreadable sector;
    determine that a logical block address range of the unreadable sector matches a logical block address range of a copy of the sector identified as the unreadable sector that was previously uploaded to a cloud storage, wherein the copy of the sector stores readable data and a match indicates that the logical block address of the unreadable sector has not changed since the copy of the sector was previously uploaded to the cloud storage;
    receive the copy of the sector from the cloud storage; and
    replace the unreadable sector with the copy of the sector at a same location in the physical memory occupied by the unreadable sector.

16. The computing device of claim 15, wherein the unreadable sector includes data that has been corrupted and cannot be recovered from data in the storage system that includes the storage device.

17. The computing device of claim 15, wherein the processor is further configured to execute the machine executable code to cause the processor to:

determine that the sector is the unreadable sector in response to the storage system that includes the storage device being unable to recover the sector.

18. The computing device of claim 15, wherein the processor is further configured to execute the machine executable code to cause the processor to:

request the copy of the sector from the cloud storage using a memory address of the unreadable sector.

19. The computing device of claim 15, wherein the processor is further configured to execute the machine executable code to cause the processor to:

request the copy of the sector identified as the unreadable sector in response to determining that the logical block address range of the unreadable sector matches a logical block address range of a copy of the sector.

* * * * *